(12) United States Patent
Connelly et al.

(10) Patent No.: US 9,898,129 B1
(45) Date of Patent: Feb. 20, 2018

(54) DISPLAYS WITH FUNCTIONAL BEZELS

(71) Applicant: Rockwell Collins, Inc., Cedar Rapids, IA (US)

(72) Inventors: John M. Connelly, Cedar Rapids, IA (US); Talha S. Ansari, Marion, IA (US); Neil C. Johnson, Cedar Rapids, IA (US); Christopher R. Chapman, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

(21) Appl. No.: 15/006,775

(22) Filed: Jan. 26, 2016

(51) Int. Cl.
*G06F 3/041* (2006.01)
*G06F 3/045* (2006.01)
*G06F 3/0488* (2013.01)

(52) U.S. Cl.
CPC ............ *G06F 3/0416* (2013.01); *G06F 3/045* (2013.01); *G06F 3/0488* (2013.01)

(58) Field of Classification Search
CPC ...... G06F 3/0416; G06F 3/0488; G06F 3/045; G06F 3/041; G06F 2203/04113
See application file for complete search history.

(56) References Cited

U.S. PATENT DOCUMENTS

| | | | |
|---|---|---|---|
| 2010/0053861 A1* | 3/2010 | Kim | H04M 1/22 361/679.01 |
| 2014/0055367 A1* | 2/2014 | Dearman | G06F 3/0488 345/173 |
| 2016/0231772 A1* | 8/2016 | Huang | G06F 1/163 |
| 2017/0075442 A1* | 3/2017 | Thomas | G02F 1/13 |

* cited by examiner

*Primary Examiner* — Adam R Giesy
(74) *Attorney, Agent, or Firm* — Angel N. Gerdzhikov; Donna P. Suchy; Daniel M. Barbieri

(57) ABSTRACT

Displays with functional bezels and methods for providing functional bezels to displays are disclosed. A display may include a touch screen, a bezel surrounding the touch screen, and a touch-sensitive zone extending along the bezel. The touch-sensitive zone may be configured to define a secondary touch location. The secondary touch location may be configured to operate jointly with the touch screen to support multi-touch operations.

18 Claims, 15 Drawing Sheets

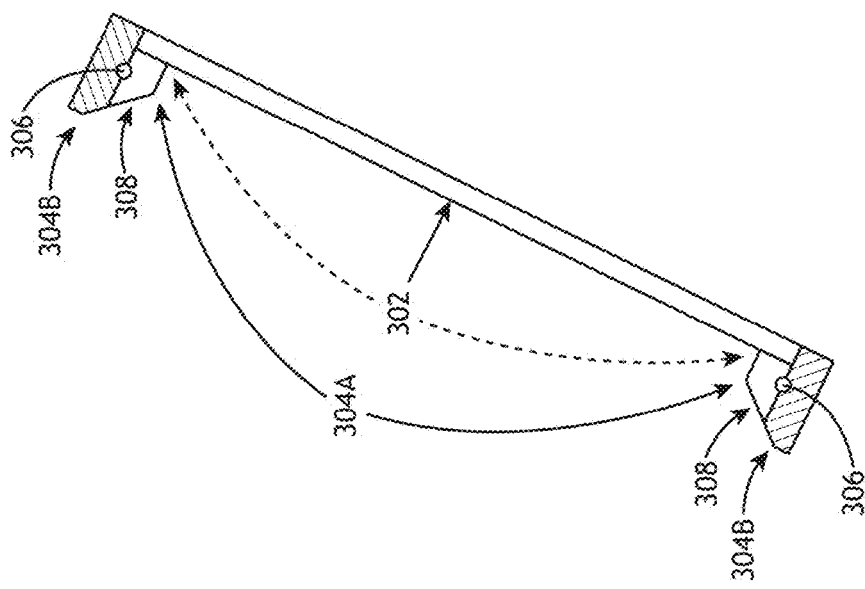
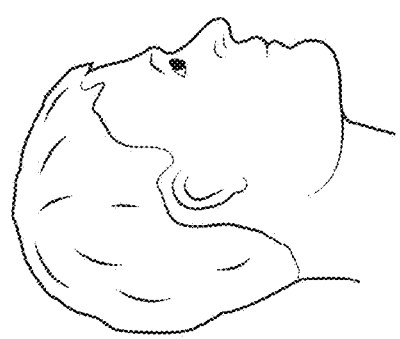
FIG. 13

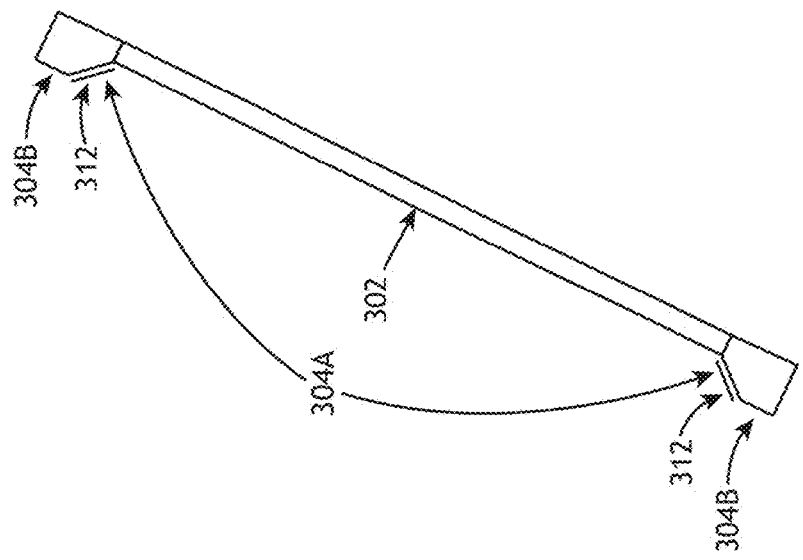
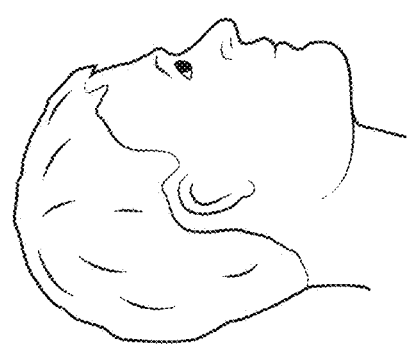
FIG. 16

DISPLAYS WITH FUNCTIONAL BEZELS

BACKGROUND

A touch screen is an electronic device that is capable of receiving user input through single- or multi-touch gestures by touching the screen with a stylus and/or one or more fingers.

There are various types of touch screens available. Some touch screens, referred to as resistive touch screens, may utilize thinly separated electrically-resistive layers to detect touch gestures. Resistive touch screens are reliable and are resistant to liquids and other contaminants, making them suitable for operating environments such as restaurants, factories, hospitals, and vehicles. However, resistive touch screens are typically implemented to support single touch gestures. Certain functions, such as zoom and scroll, tend to be cumbersome to carry out with only single touch gestures.

SUMMARY

In one aspect, embodiments of the inventive concepts disclosed herein are directed to a display. The display may include a touch screen, a bezel surrounding the touch screen, and a touch-sensitive zone extending along the bezel. The touch-sensitive zone may be configured to define a secondary touch location. The secondary touch location may be configured to operate jointly with the touch screen to support multi-touch operations.

In a further aspect, embodiments of the inventive concepts disclosed herein are directed to a system. The system may include a bezel surrounding a touch screen and a touch-sensitive zone extending along the bezel. The system may also include a controller in communication with the touch screen and the touch-sensitive zone. The touch-sensitive zone may be configured to define a secondary touch location, and the controller may be configured to facilitate multi-touch operations based on interactions of touch gestures received by the touch screen and the touch-sensitive zone.

In another aspect, embodiments of the inventive concepts disclosed herein are directed to a method. The method may include: associating a touch-sensitive zone to an edge of a touch screen; receiving touch gestures received by the touch screen and the touch-sensitive zone; and facilitating multi-touch operations based on interactions of the touch gestures received by the touch screen and the touch-sensitive zone.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 13 is a cross-sectional view depicting a display according to an exemplary embodiment of the inventive concepts disclosed herein;

FIG. 16 is a cross-sectional view depicting a display according to an exemplary embodiment of the inventive concepts disclosed herein.

DETAILED DESCRIPTION

Figure 1:
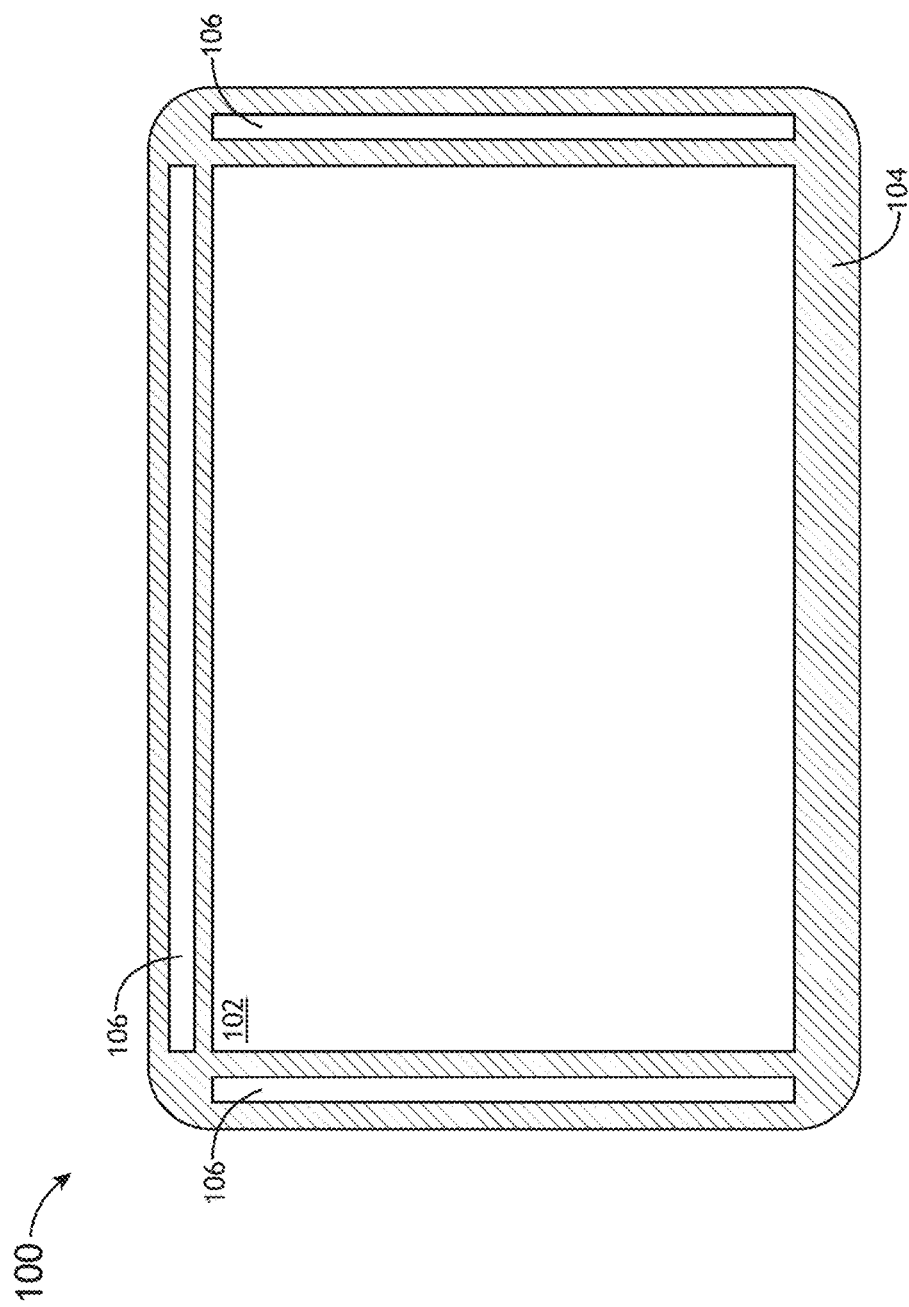
FIG. 1 is a front view of a display according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed systems and methods for providing smart bezels to touch screens. In some embodiments, the outside frame (referred to as the bezel) around a touch screen may be configured to function as one or more secondary touch locations. The secondary touch locations may be utilized to activate context menus and/or to operate in conjunction with the touch screen and provide support for multi-touch gestures. It is contemplated that providing multi-touch capabilities to single-touch screens may be appreciated for various reasons. For example, by allowing the touch screen itself to remain as a single-touch screen, the complexity and the cost of the touch screen may be reduced. In addition, the secondary touch locations provided in accordance with the inventive concepts disclosed herein may be easy to install (compared to replacing a single-touch screen with a multi-touch screen). The touch screen may also implement resistive touch technologies, which may be preferred over other touch technologies, particularly in operating environments (e.g., aircraft flight displays) where false touches and electromagnetic interferences must be avoided.

Figure 2:
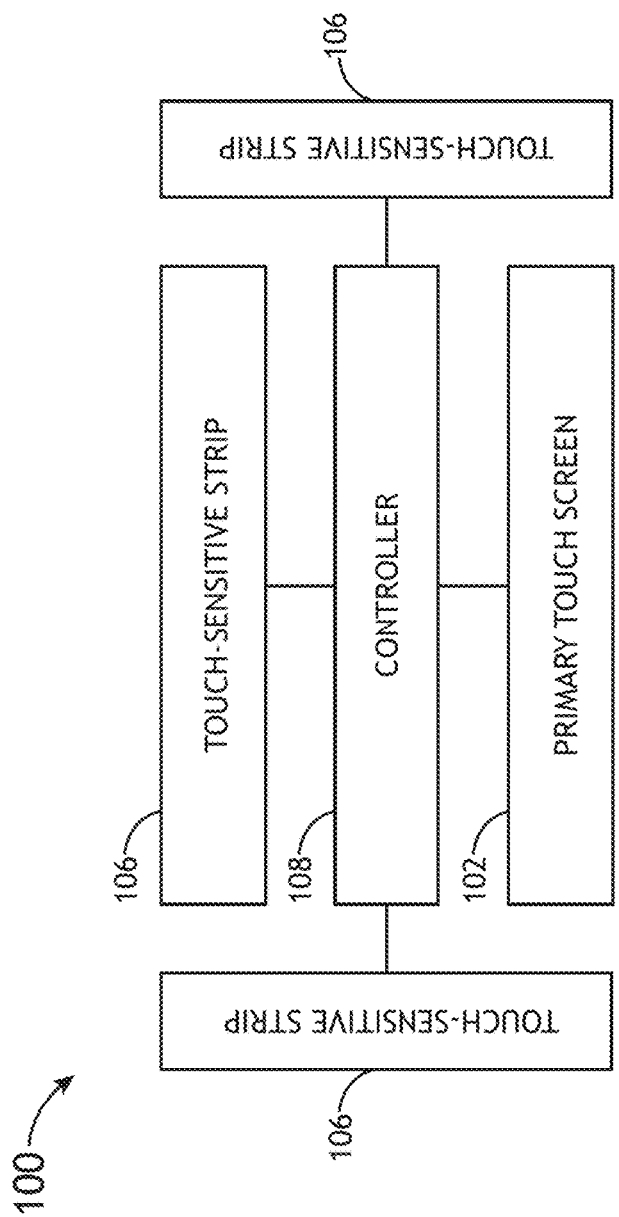
FIG. 2 is a block diagram depicting a display according to an exemplary embodiment of the inventive concepts disclosed herein.

Referring generally to FIGS. 1-2. FIG. 1 shows a front view of an exemplary display 100 configured in accordance with an embodiment of the inventive concepts disclosed herein, and FIG. 2 shows a block diagram depicting the display 100 of FIG. 1. The display 100 may include a touch screen 102 surrounded by a bezel 104. One or more touch-sensitive strips 106 may be positioned on the bezel 104. The touch-sensitive strips 106 may implement various touch technologies, including resistive touch technologies, allowing the touch-sensitive strips 106 to function as secondary touch locations.

It is contemplated that the touch-sensitive strips 106 may be configured as embedded components of the bezel 104 or as portable attachments to the bezel 104. It is contemplated that the placement and quantity of the touch-sensitive strips 106 may be configured based on operational requirements. For example, a single continuous touch-sensitive strip 106 may extend along an entire perimeter of the bezel 104. Alternatively, multiple individual touch-sensitive strips 106 may extend at least partially along one or more sides/edges of the bezel 104. Additionally, a touch-sensitive strip 106 may be partitioned into one or more segments, wherein each segment may be independently activated/deactivated (e.g., using a controller 108), allowing the secondary touch locations provided by such a touch-sensitive strip 106 to be configurable without any physical changes to the touch-sensitive strip 106.

It is contemplated that touch gestures received by the touch screen 102 and the touch-sensitive strips 106 may be provided via one or more wired or wireless communication interfaces to the controller 108 for processing. The controller 108 may reside in the bezel 104 and/or the touch screen 102 housing. The controller 108 may include one or more dedicated processing devices, application-specific integrated circuits (ASICs), field-programmable gate arrays (FPGAs), or various other types of processors or processing devices configured to process the touch gestures received and provide multi-touch capabilities based on detected interactions of the touch gestures received. FIGS. 3-10 are illustrations depicting some exemplary operations supported by the display 100.

Figure 3:
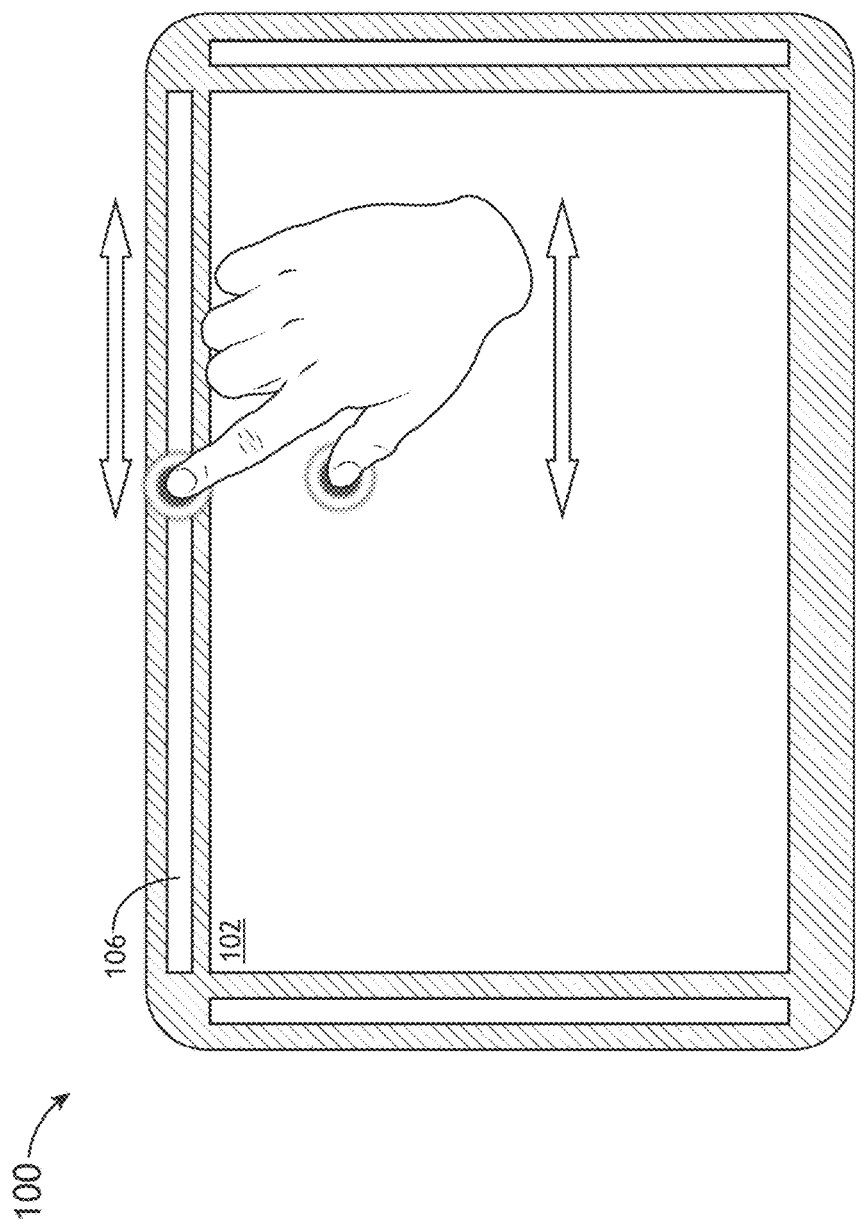
FIG. 3 is an illustration depicting a scroll operation that may be engaged using a display according to an exemplary embodiment of the inventive concepts disclosed herein.

More specifically, as shown in FIG. 3, a scroll operation (may also be referred to as panning) may be engaged when a user simultaneously touches and holds the touch screen 102 and one of the horizontal and/or vertical touch-sensitive strips 106. A zoom operation, as shown in FIG. 4, may be engaged when a user touches and holds the touch screen 102 to define a center point for the zoom operation and drags a touch point along one of the touch-sensitive strips 106 to zoom in/out around the center point.

Figure 4:
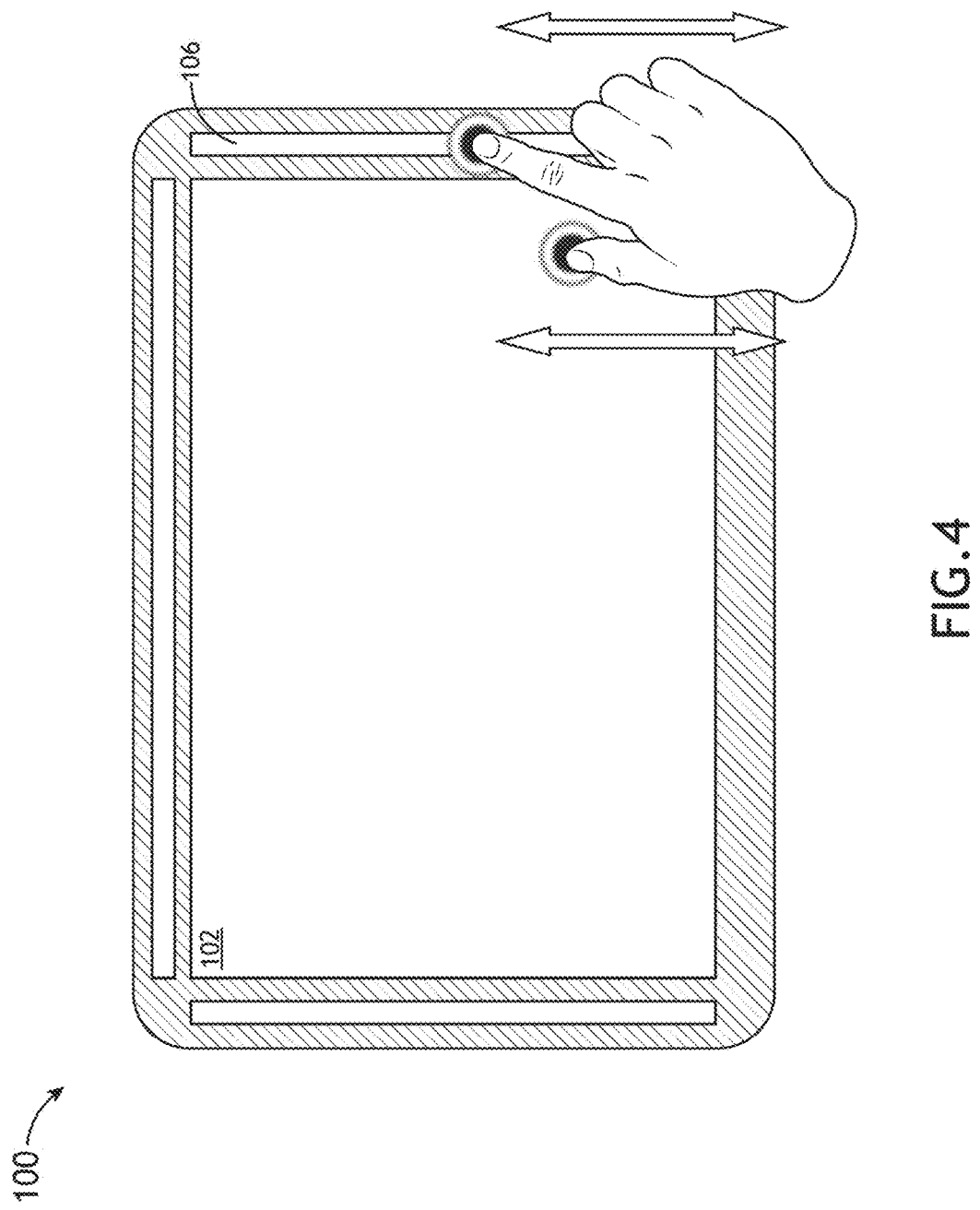
FIG. 4 is an illustration depicting a zoom operation that may be engaged using a display according to an exemplary embodiment of the inventive concepts disclosed herein.

It is to be understood that the gestures shown in FIGS. 3 and 4 are merely exemplary and are not meant to be limiting. It is contemplated that gestures supported by the display 100 may be defined based on operational requirements and/or user preferences without departing from the broad scope of the inventive concepts disclosed herein. For instance, dragging a touch point along one of the touch-sensitive strips 106 may be configured to engage scroll operations. In another example, a touch point on the touch screen 102 and a touch point on one of the touch-sensitive strips 106 may jointly enable multi-touch gestures such as pinch-to-zoom and the like.

Figure 5:
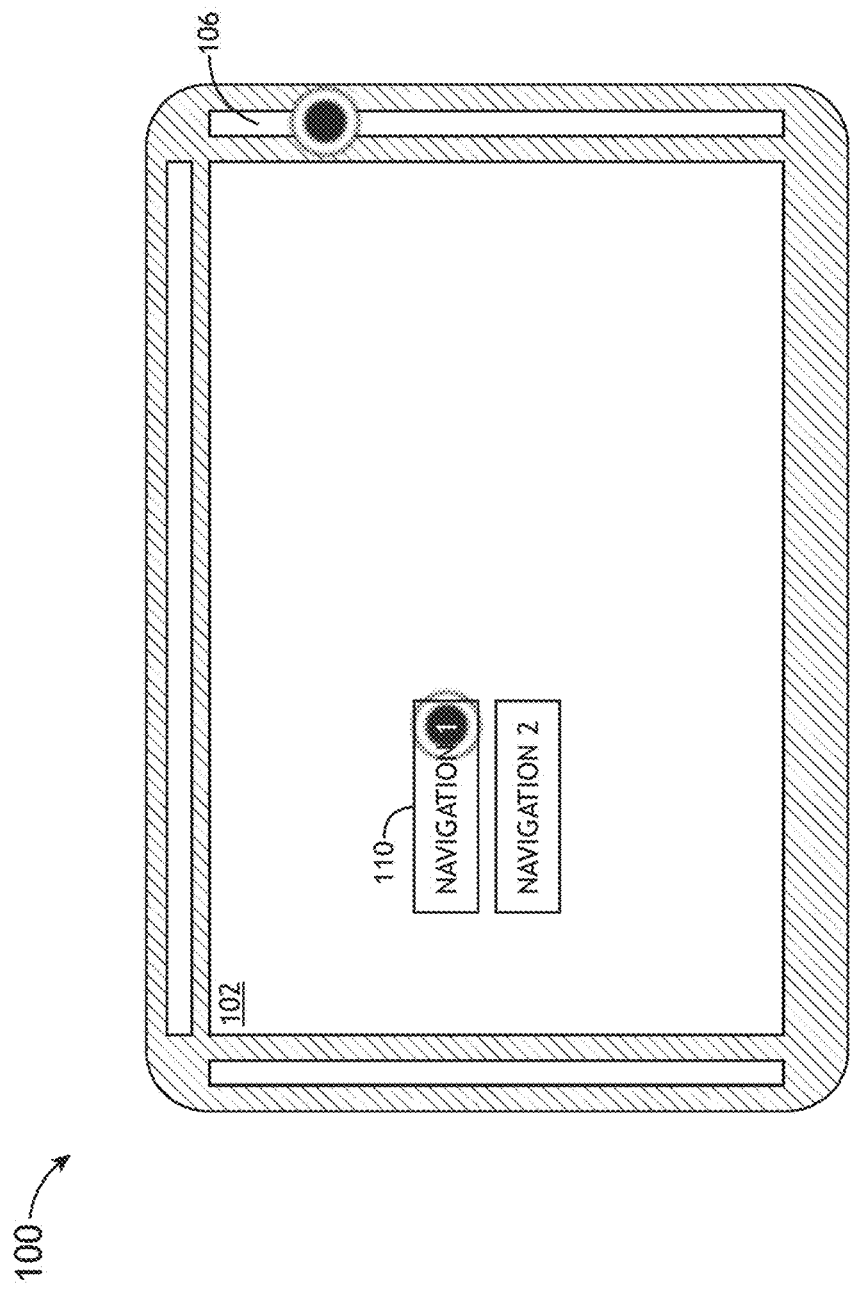
FIG. 5 is an illustration depicting an option menu that may be activated using a display according to an exemplary embodiment of the inventive concepts disclosed herein.
Figure 6:
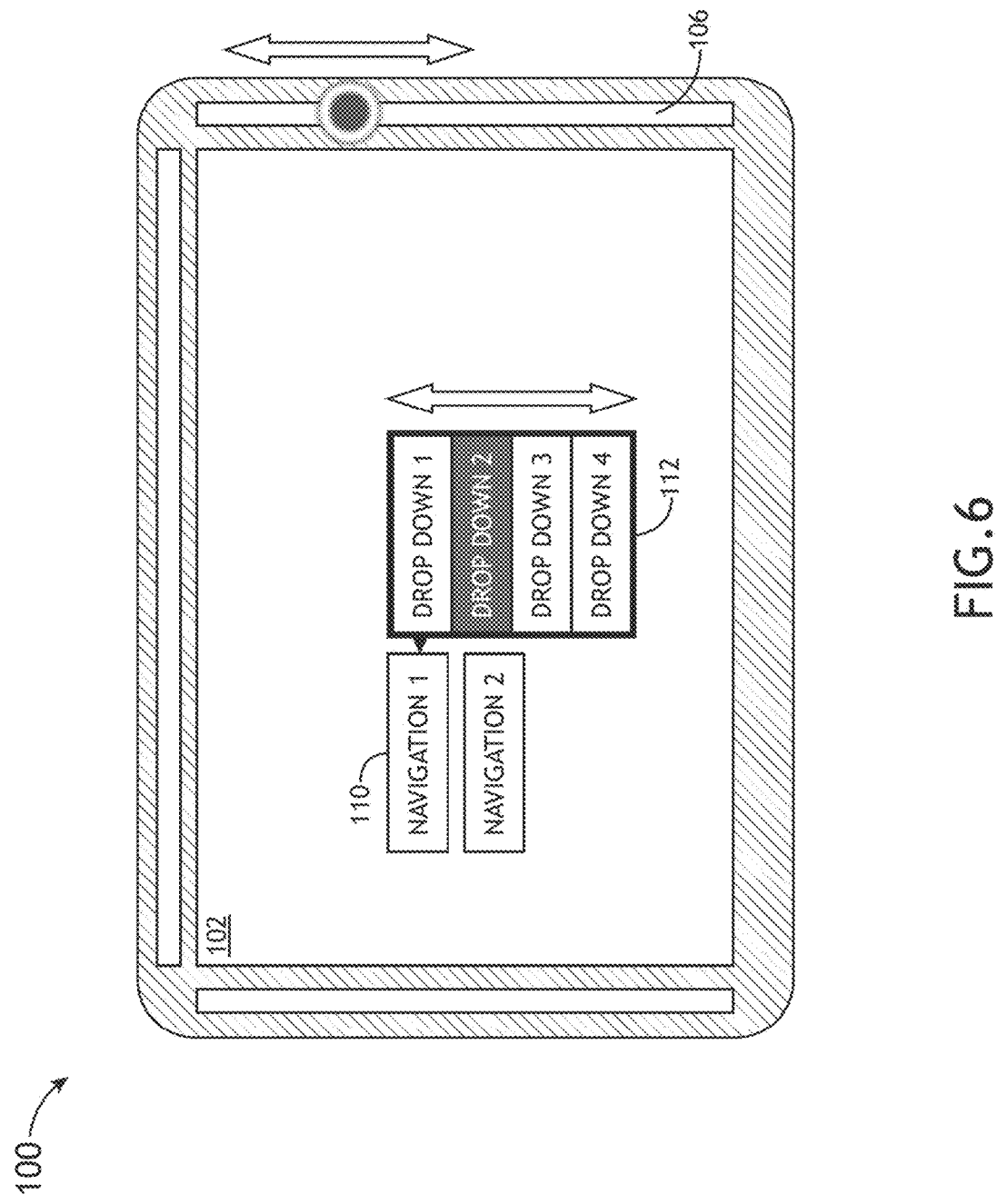
FIG. 6 is another illustration depicting a menu option that may be activated using a display according to an exemplary embodiment of the inventive concepts disclosed herein.

It is also contemplated that the touch-sensitive strips 106 may be utilized to engage other functions in addition to zoom and scroll. For example, as shown in FIGS. 5-6, a user may touch one of the touch-sensitive strips 106 while touching a display element 110 on the touch screen 102 to enable a secondary/specialized menu option 112 (which may otherwise be hidden from the display interface). The user may then scroll through the menu 112 using the touch screen 102 and/or one of the touch-sensitive strips 106.

Figure 7:
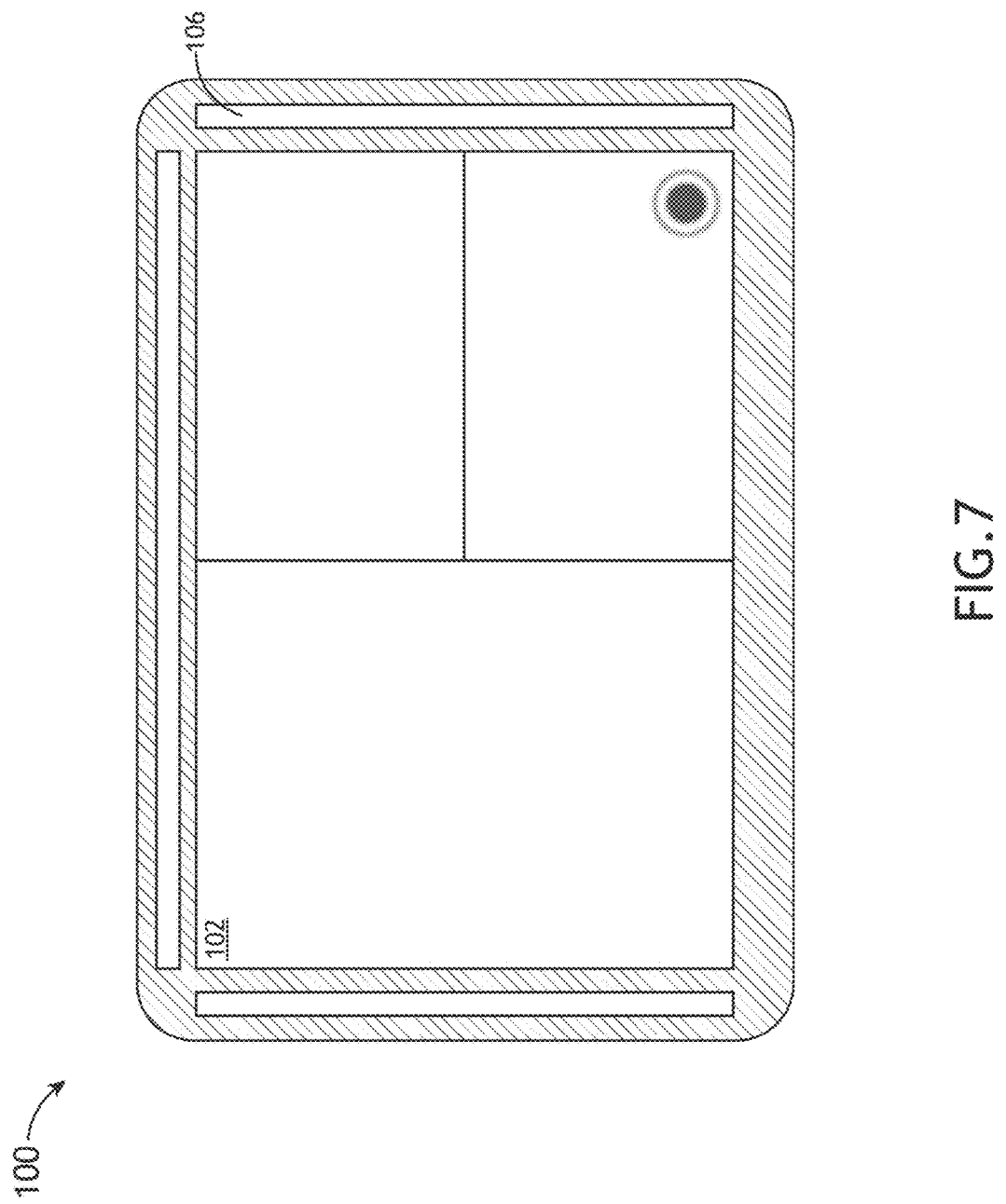
FIG. 7 is an illustration depicting a format change that may be carried out using a display according to an exemplary embodiment of the inventive concepts disclosed herein.
Figure 8:
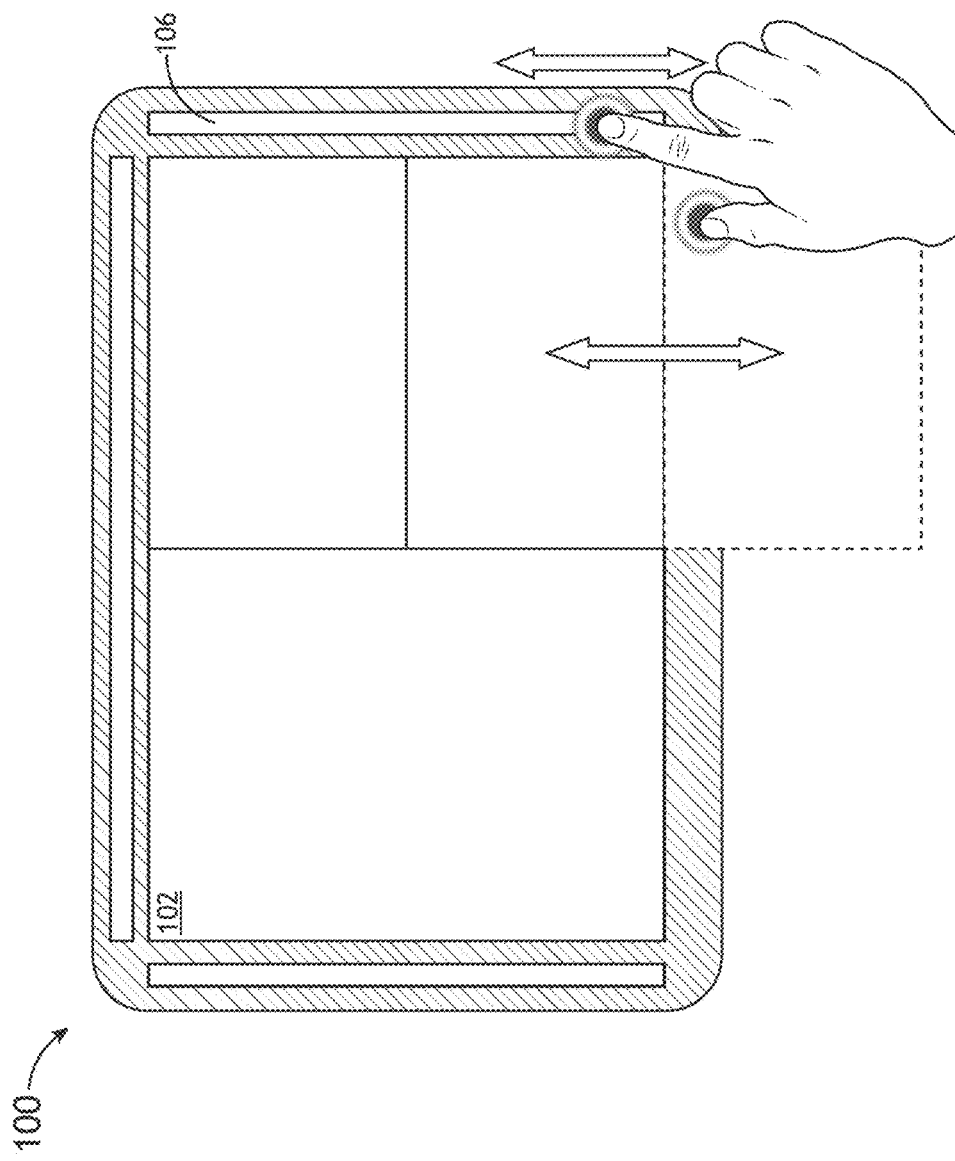
FIG. 8 is another illustration depicting a format change that may be carried out using a display according to an exemplary embodiment of the inventive concepts disclosed herein.
Figure 9:
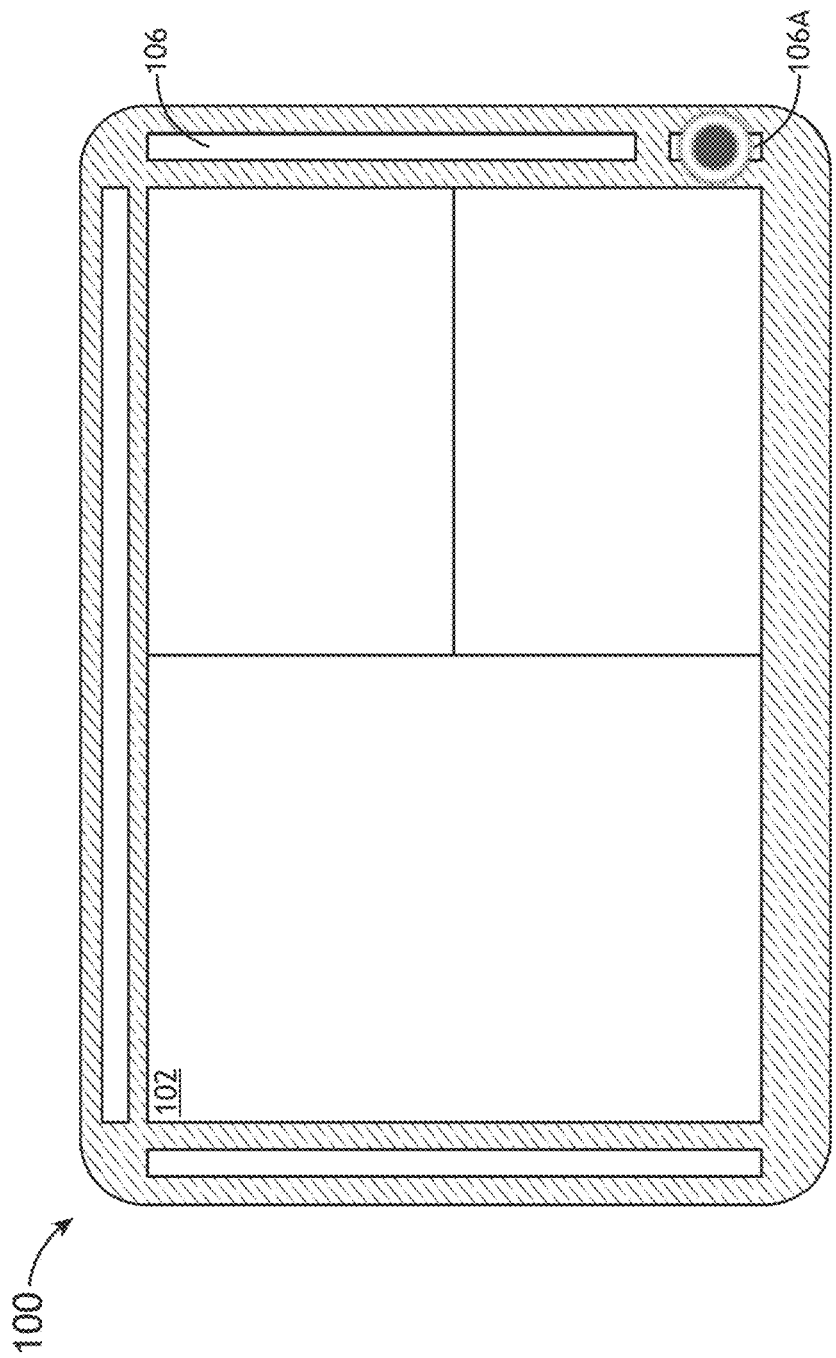
FIG. 9 is another illustration depicting a format change that may be carried out using a display according to an exemplary embodiment of the inventive concepts disclosed herein.
Figure 10:
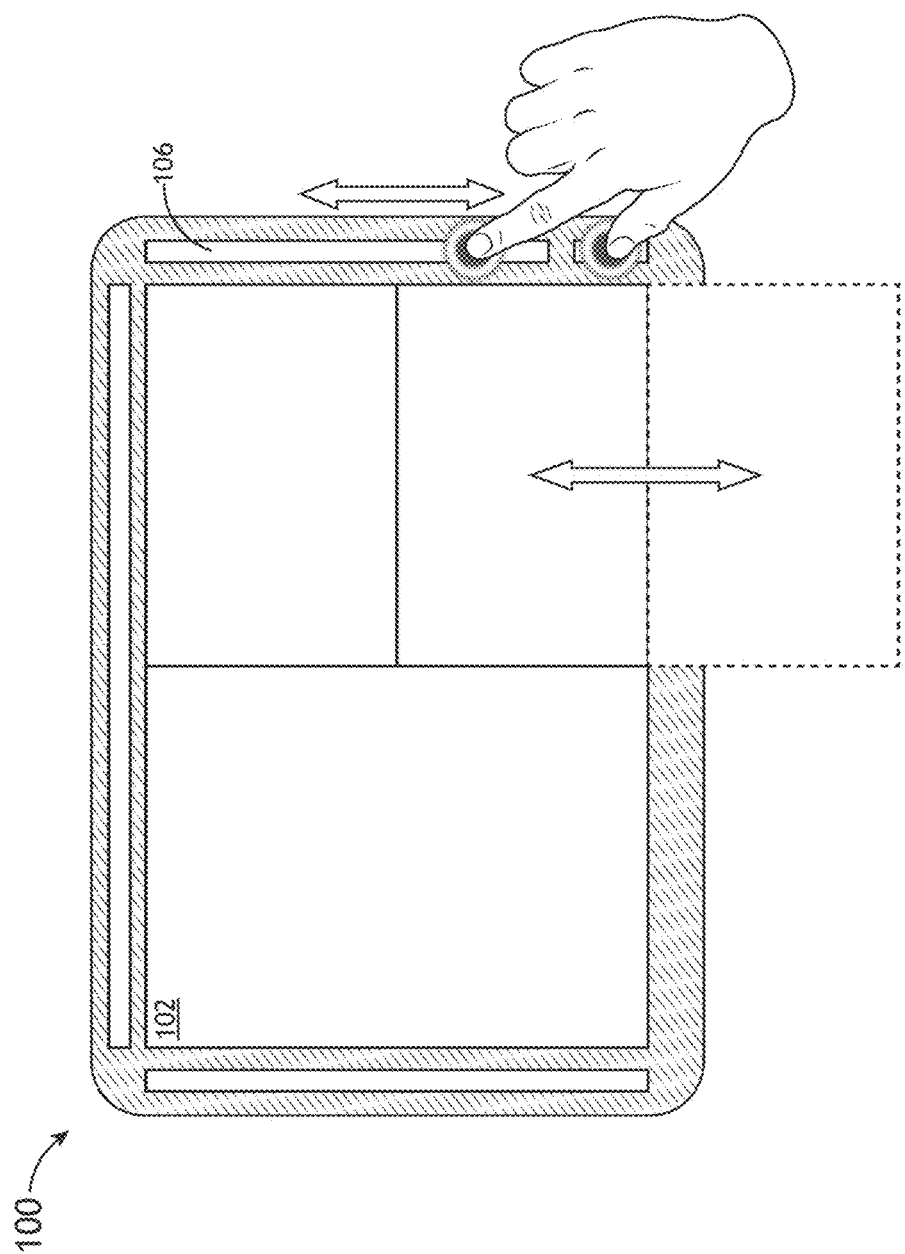
FIG. 10 is another illustration depicting a format change that may be carried out using a display according to an exemplary embodiment of the inventive concepts disclosed herein.

In another example, as shown in FIGS. 7-10, a user may utilize the touch-sensitive strips 106 to change the content or the format of a display window. More specifically, the user may touch a predetermined location within a display window to enable the change (FIG. 7). Once the change is enabled, the user may use the touch screen 102 and/or one of the touch-sensitive strips 106 to scroll through different options for the display window (FIG. 8). Alternatively and/or additionally, a segment 106A of one of the touch-sensitive strips 106 may be dedicated as a predetermined location for enabling content or format changes (FIG. 9). The user may touch the dedicated segment 106A to enable and carry out the change using one of the touch-sensitive strips 106 (FIG. 10).

It is to be understood that the various gestures shown in FIGS. 3-10 are merely exemplary and are not meant to be limiting. It is contemplated that various types of gestures may be supported by the display 100 to carry out various types of operations without departing from the broad scope of the inventive concepts disclosed herein. It is also to be understood that while aircraft and aircraft flight displays are referenced in the examples described above, the exemplary display 100 is not limited to applications in airborne vehicles. It is contemplated that the display 100 may be utilized in various operating environments without departing from the broad scope of the inventive concepts disclosed herein.

Figure 11:
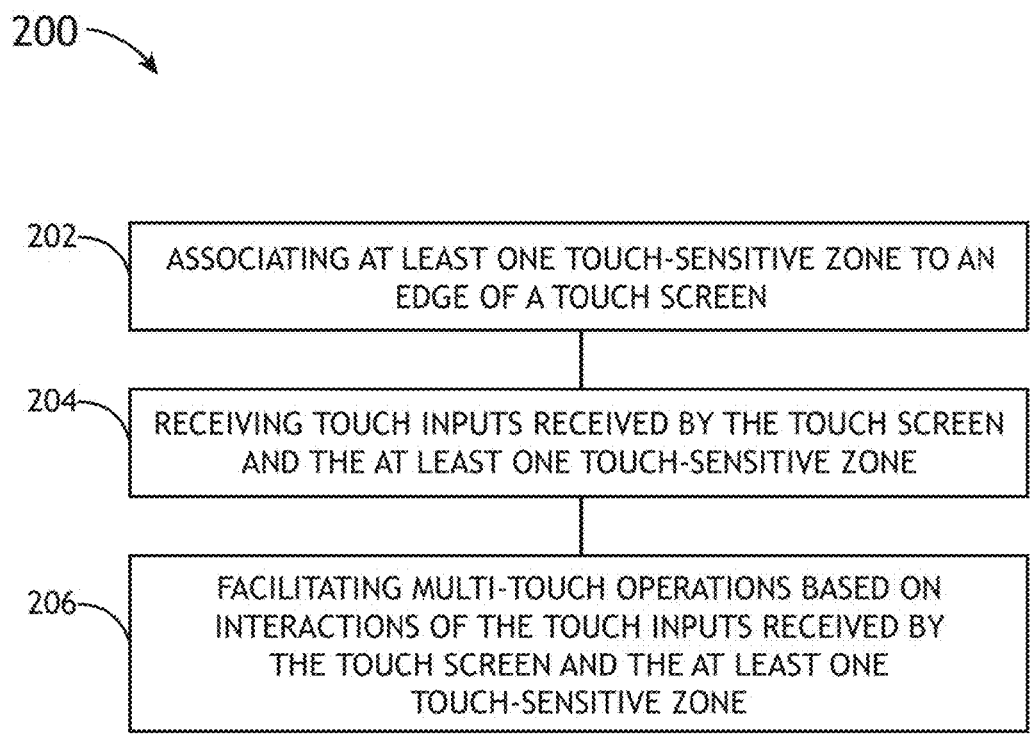
FIG. 11 is a flow diagram depicting a method for providing multi-touch capabilities to a single-touch screen according to an exemplary embodiment of the inventive concepts disclosed herein.

Referring now to FIG. 11, a flow diagram depicting an exemplary method 200 for providing multi-touch capabilities to a single-touch screen is shown. More specifically, a step 202 may associate one or more touch-sensitive strips to an edge of a touch screen. As illustrated above, the one or more touch-sensitive strips may be positioned to extend at least partially along an edge of the touch screen. A step 204 may receive touch gestures received by the touch screen and the one or more touch-sensitive strips, which may be processed jointly in a step 206 to facilitate multi-touch operations.

It is to be understood that while the touch screens referenced in the examples above may be implemented as single-touch screens, such implementations are exemplary and are not meant to be limiting. It is also to be understood that while the touch-sensitive strips may be configured as elongated touch-sensitive components, such configurations are merely exemplary and are not meant to be limiting. It is contemplated that touch-sensitive components of various shapes and/or sizes may be utilized to serve as touch-sensitive strips (may also be referred to as zones) without departing from the broad scope of the inventive concepts disclosed herein.

It is also contemplated that the touch-sensitive zones configured in accordance with embodiments of the inventive concepts disclosed herein may be utilized to provide additional touch locations without departing from the broad scope of the inventive concepts disclosed herein. It is further contemplated that displays configured in accordance with the inventive concepts disclosed herein may implement touch technologies in addition to resistive touch technologies referenced in the examples above.

Furthermore, it is to be understood that while the bezel around a touch screen may be configured to function as one or more non-display secondary touch locations, such a configuration is not meant to be limiting. It is contemplated that the bezel around a touch screen may include one or more display elements, allowing the bezel to provide one or more secondary display surfaces in addition to serving as one or more secondary touch locations.

Figure 12:
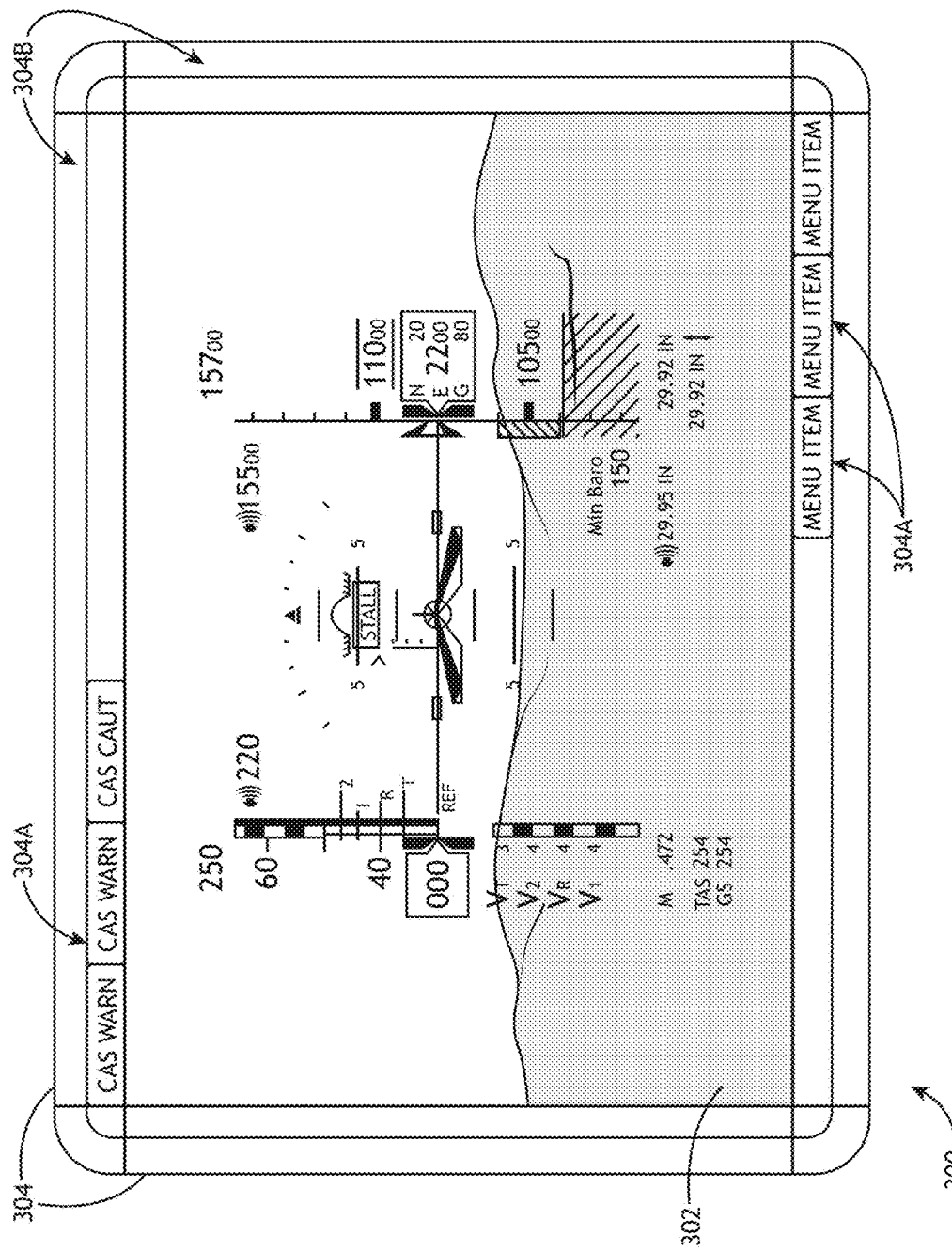
FIG. 12 is a front view of a display according to an exemplary embodiment of the inventive concepts disclosed herein.

Referring now to FIG. 12, an exemplary display 300 configured in accordance with an embodiment of the inventive concepts disclosed herein is shown. The display 300 may include a touch screen 302 at least partially surrounded by a bezel 304. It is noted that a portion of the bezel (e.g., the inner bezel 304A) may be configured to provide secondary display surfaces. The inner bezel 304A and/or the outer bezel 304B may also implement certain touch technologies, allowing the inner bezel 304A and/or the outer bezel 304B to function as secondary touch locations as previously described.

The secondary display surfaces provided in this manner may be suitable for displaying secondary display items such as messages, dialog boxes, control menus, and/or other display items that may not need to be displayed on the touch screen 302 at all times. The secondary display surfaces may be user-activated and/or system-activated, and it is contemplated that the secondary display surfaces provided in this manner may help reduce on-screen clutter (e.g., by moving the secondary display items from the touch screen 302 to the bezel 304), which in turn may help reduce visual interferences with important information displayed on the touch screen 302.

Figure 14:
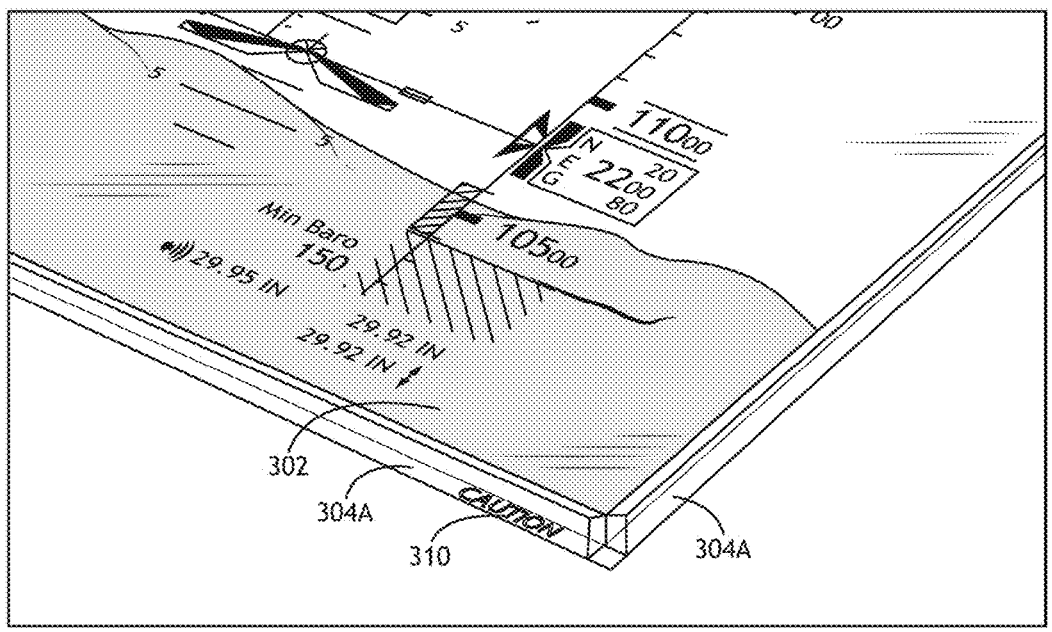
FIG. 14 is a partial isometric view depicting a bezel of a display according to an exemplary embodiment of the inventive concepts disclosed herein.
Figure 15:
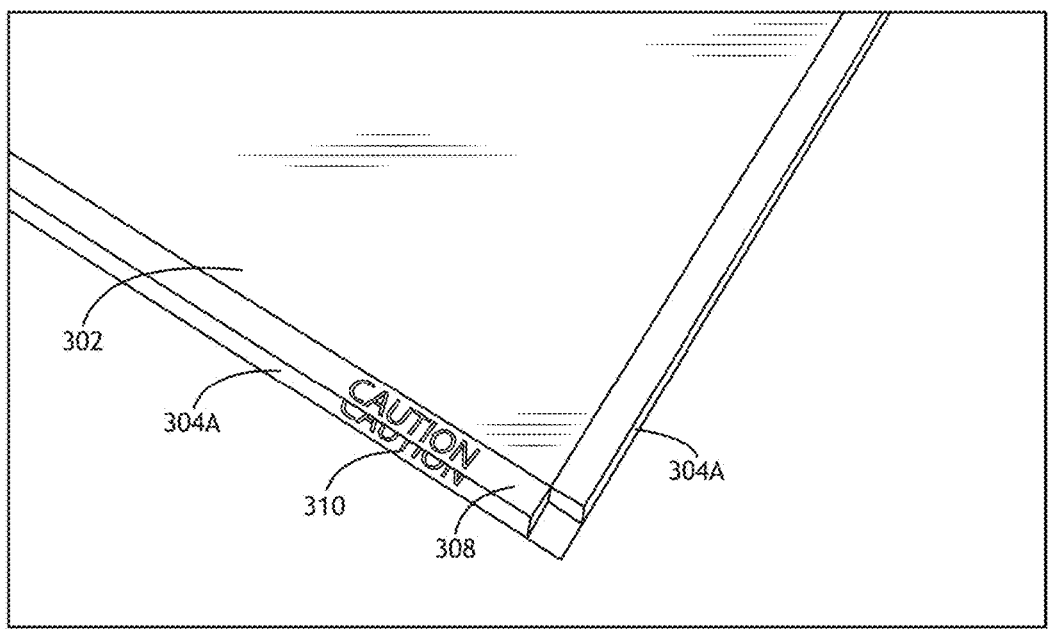
FIG. 15 is another partial isometric view depicting a bezel of a display according to an exemplary embodiment of the inventive concepts disclosed herein.

It is contemplated that various display techniques may be utilized to implement the bezel 304. For example, as shown in FIGS. 13-15, the inner bezel 304A may be configured to function as a light guide, which may be positioned to deliver a portion of the image 310 produced on the underlying touch screen 302 to a display surface 308 of the inner bezel 304A. It is to be understood that while the display surface 308 is shown to be angled in FIG. 13, such an implementation is merely exemplary and is not meant to be limiting. It is also to be understood that in certain implementations, anchors 306 may be positioned to support rotational movement of the inner bezel 304A (e.g., rotate about the anchor 306), allowing the inner bezel 304A to rotate slightly toward the underlying touch screen 302, effectively enabling the inner bezel 304A to serve as a button.

Alternatively, the inner bezel 304A may be overlaid with a display layer 312 as shown in FIG. 16. It is contemplated that the display layer 312 may implement various types of thin emissive display technologies, including organic light-emitting diode (OLED) technologies. It is also contemplated that the display layer 312 may be configured to be touch-sensitive, allowing the inner bezel 304A to function as secondary touch locations as previously described.

It is to be understood that while the bezels 304 shown in FIGS. 12-16 may include inner bezels 304A and outer bezels 304B, references to the inner bezels 304A and the outer bezels 304B are merely exemplary and are not meant to be limiting. It is contemplated that the inner bezels 304A and the outer bezels 304B may be implemented as separate components that jointly form the bezels 304 shown in FIGS. 12-16, or they may be implemented as single-piece constructions without departing from the broad scope of the inventive concepts disclosed herein.

As will be appreciated from the above, displays configured according to embodiments of the inventive concepts disclosed herein may provide multi-touch capabilities to single-touch screens, which may be appreciated for various reasons. Displays configured according to embodiments of the inventive concepts disclosed herein may also provide additional display surfaces, which may help reduce on-screen clutter and visual interferences.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A display, comprising:
  a touch screen;
  a bezel at least partially surrounding the touch screen, the bezel being raised above an outer surface of the touch screen, the bezel including an inner bezel and an outer bezel at least partially surrounding the inner bezel, the inner bezel extending at a non-perpendicular angle from the outer surface of the touch screen toward the outer bezel; and
  at least one touch-sensitive zone extending at least partially along the bezel, the at least one touch-sensitive zone configured to define at least one secondary touch location, wherein the at least one secondary touch location is configured to operate jointly with the touch screen to support multi-touch operations, wherein the at least one touch-sensitive zone includes at least one display element, wherein the at least one display element extending at least partially along the bezel implements a light guide positioned to deliver a portion of an image produced by the touch screen to a display surface of the at least one display element of the at least one touch-sensitive zone, the display surface of the at least one display element of the at least one touch-sensitive zone positioned along the bezel.

2. The apparatus of claim 1, wherein the touch screen is a single-touch screen.

3. The apparatus of claim 1, wherein the touch screen implements a resistive touch technology.

4. The apparatus of claim 1, wherein the at least one touch-sensitive zone is configured to display a secondary display item.

5. The apparatus of claim 1, wherein the at least one touch-sensitive zone comprises a plurality of segments.

6. The apparatus of claim 5, wherein each segment of the plurality of segments is independently activated/deactivated based on a specific configuration.

7. The apparatus of claim 1, wherein the display is an aircraft flight display.

8. The apparatus of claim 1, wherein the at least one display element extends at least partially along the inner bezel and implements the light guide positioned to deliver the portion of the image produced by the touch screen to the display surface of the at least one display element of the at least one touch-sensitive zone, the display surface of the at least one display element of the at least one touch-sensitive zone positioned along the inner bezel.

9. A system, comprising:
  a bezel at least partially surrounding a touch screen, the bezel being raised above an outer surface of the touch screen, the bezel including an inner bezel and an outer bezel at least partially surrounding the inner bezel, the inner bezel extending at a non-perpendicular angle from the outer surface of the touch screen toward the outer bezel;
  at least one touch-sensitive zone extending at least partially along the bezel, the at least one touch-sensitive zone configured to define at least one secondary touch location;
  at least one display element extending at least partially along the bezel, wherein the at least one display element extending at least partially along the bezel implements a light guide positioned to deliver a portion of an image produced by the touch screen to a display surface of the at least one display element of the at least one touch-sensitive zone, the display surface of the at least one display element of the at least one touch-sensitive zone positioned along the bezel; and
  a controller in communication with the touch screen and the at least one touch-sensitive zone, the controller configured to facilitate multi-touch operations based on interactions of touch gestures received by the touch screen and the at least one touch-sensitive zone.

10. The system of claim 9, wherein the at least one display element is configured to display a secondary display item.

11. The system of claim 9, wherein the at least one display element is implemented on the at least one touch-sensitive zone.

12. The system of claim 9, wherein the at least one touch-sensitive zone comprises a plurality of segments.

13. The system of claim 12, wherein each segment of the plurality of segments is independently activated/deactivated based on a specific configuration.

14. The system of claim 9, wherein the system forms a part of an electronic system onboard an aircraft.

15. A method, comprising:

associating at least one touch-sensitive zone to an edge of a touch screen, wherein a bezel at least partially surrounds the touch screen, the bezel being raised above an outer surface of the touch screen, the bezel including an inner bezel and an outer bezel at least partially surrounding the inner bezel, the inner bezel extending at a non-perpendicular angle from the outer surface of the touch screen toward the outer bezel, wherein the at least one touch-sensitive zone extends at least partially along the bezel, wherein the at least one touch-sensitive zone includes at least one display element, wherein the at least one display element extending at least partially along the bezel implements a light guide positioned to deliver a portion of an image produced by the touch screen to a display surface of the at least one display element of the at least one touch-sensitive zone, the display surface of the at least one display element of the at least one touch-sensitive zone positioned along the bezel;

receiving touch gestures received by the touch screen and the at least one touch-sensitive zone; and facilitating multi-touch operations based on interactions of the touch gestures received by the touch screen and the at least one touch-sensitive zone.

16. The method of claim 15, wherein the step of associating the at least one touch-sensitive zone to the edge of the touch screen comprises positioning the at least one touch-sensitive zone at least partially along the edge of the touch screen.

17. The method of claim 15, wherein the at least one touch-sensitive zone comprises a plurality of segments.

18. The method of claim 17, wherein each segment of the plurality of segments is independently activated/deactivated based on a specific configuration.

* * * * *